United States Patent

[11] 3,598,212

| [72] | Inventor | Emil Giese |
| | | Bad Homburg vor der Hohe, Germany |
| [21] | Appl. No. | 2,321 |
| [22] | Filed | Jan. 12, 1970 |
| [45] | Patented | Aug. 10, 1971 |
| [73] | Assignee | Ringspann Albrecht Maurer K.G. |
| | | Bad Homburg vor der Hohe, Germany |
| [32] | Priority | Mar. 27, 1969 |
| [33] | | Germany |
| [31] | | P 19 15 567.0 |

[54] RETAINER RING FOR A FREEWHEEL CLUTCH
8 Claims, 10 Drawing Figs.

[52] U.S. Cl. ................................................. 192/45.1, 192/41 A
[51] Int. Cl. ............................................... F16d 41/07
[50] Field of Search ............................................. 192/41 A, 45.1

[56] References Cited
UNITED STATES PATENTS

| 2,570,290 | 10/1951 | Turner | 192/45.1 |
| 2,750,019 | 6/1956 | Ferris | 192/45.1 |
| 2,966,246 | 12/1960 | Dodge | 192/45.1 |
| 3,207,278 | 9/1965 | Titt | 192/45.1 |

FOREIGN PATENTS

| 1,254,264 | 1/1961 | France | 192/45.1 |

Primary Examiner—Allan D. Herrmann
Attorney—Jennings Bailey, Jr.

ABSTRACT: A retainer ring for insertion between the coaxially arranged driving member and the driven member of a freewheel clutch comprises a central ring portion having elongated holes wherein tiltable sprags are disposed, and two ring portions extending in radial direction from the central ring portion to the convex-cylindrical bearing surface of the inner clutch member and to the concave-cylindrical bearing surface of the outer clutch member. The retainer ring is of Z-, H- or U-shaped cross section and the sprags are supported in the holes of the central ring portion by helical springs mounted on lugs projecting to the inside of the holes. One spring end is bent over for engaging the sprag in a groove, thereby securing it against displacement in radial clutch direction.

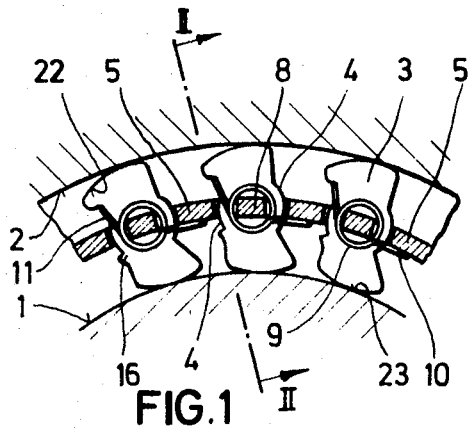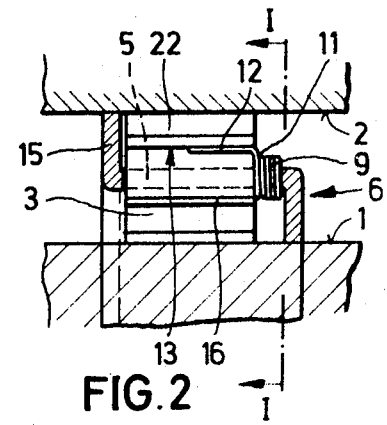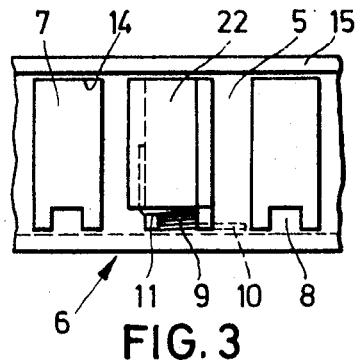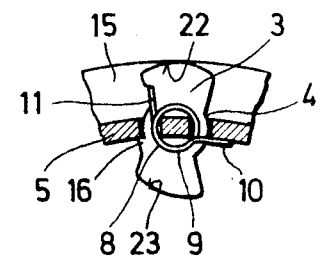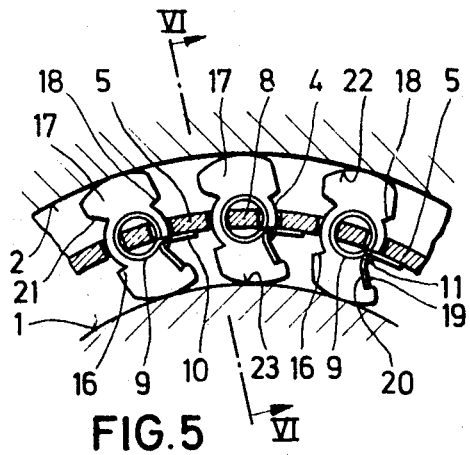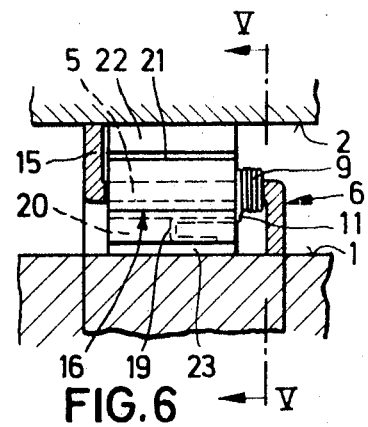
INVENTOR
EMIL GIESE
BY

INVENTOR
EMIL GIESE

RETAINER RING FOR A FREEWHEEL CLUTCH

BACKGROUND OF THE INVENTION

1. Field of the Invention

The present invention relates to rings for retaining tiltable sprags equidistantly spaced from one another between the coaxially arranged cylindrical bearing surfaces of the driving and the driven member of a freewheel clutch.

2. The Prior Art

It is known in the art to secure the sprags between the driving and the driven clutch member by a cage or retainer ring having bridge portions which extend in axial direction of the clutch and which separate the sprags from one another. Such a retainer ring must especially be provided if the clutch is to couple and decouple the driving and the driven clutch members as the result of jerking changes of the angular velocity of the clutch members. The retainer ring is then necessary for keeping the sprags from interfering with one another in their tilting motion which would cause an uneven distribution of the load to be carried by the different sprags.

FUrther, it is known in the art to provide individual spring means with every sprag for urging each sprag into clamping position independently from all other sprags in the clutch. By the individual spring each sprag will be tilted through a different angle, if necessary, and will thus be automatically adjusted in its position to different distances between the inner and the outer clutch member. Such differences in distances may occur as the result of tolerances or inaccuracies in manufacture of the clutch members. Extreme accuracy in production need, therefore, not be observed if one separate spring is attached to each sprag.

In the U.S. Pat. No. 3,443,672, issued May 13, 1969 to applicant, a retainer ring is disclosed which comprises separate helical springs arranged adjacent one face of each tiltable sprag in a recess of the corresponding ring link, and the bridge portions of the ring or cage have partially cylindrical bearing surfaces wherein the cylindrical surface areas of the sprags are supported, thereby securing the sprags in radial direction of the clutch. Arranging the helical springs concentrically to the tilting axis of the sprags has proven particularly advantageous for tilting the sprags to their clamping position. By using wire of different diameter the springs can be adjusted in a simple manner to the different requirements of various operation conditions.

Further, the sprags in the known retainer ring are safely kept in position both in axial and in radial direction of the clutch. After mounting the sprags in the ring, the sprags cannot drop out so that the danger of losing sprags out of the ring, for example during shipment, is completely eliminated. Moreover, mounting the helical springs alongside the faces of the sprags but independently therefrom has the advantage that the centrifugal weight of the springs does not press on the sprags during rotation of the ring. This reduces substantially the friction and wear between the clamping surface of the sprags and the bearing surfaces of the clutch members when the retainer ring rotates idle, i.e. during freewheeling.

Also, the specific arrangement of the springs in the retainer ring as disclosed in the mentioned U.S. patent makes possible the construction of a freewheel clutch of very short dimension in the axial direction.

It is, however, a disadvantage of the known device that the retainer ring must be assembled from two separate parts, namely from a cage ring having bridge portions extending perpendicularly from the ring and from a cover ring which is to be placed on the bridge portions after the sprags and springs have been inserted between those portions. The latter are provided with cylindrical studs at their free ends and the ring has corresponding holes. Assembling the retainer ring is accomplished by placing the cover ring on the bridge portions so that the studs engage the holes wherein they are secured by a bonding agent. Such a retainer ring construction is rather complicated and expensive both in the manufacture of the component parts and in the actual mounting of the ring. Besides, depending on the particular design, the rings and bridge portions are rather thick, thus requiring much raw material for the manufacture and also being rather heavy. The weight can, of course, be reduced if the ring and the cover ring are die-cast from plastics. However, it has proven that retainer rings manufactured from plastics are not resistant to high thermal and mechanical loads.

It is, therefore, an object of the present invention to provide a retainer ring with mounted sprags for freewheel clutches which overcomes the above described disadvantages of the prior art rings. It is a particular object to provide a retainer ring which is resistant to high thermal and mechanical load. It is a further object to provide a retainer ring of which the component parts are light in weight, can be inexpensively manufactured and readily assembled. Besides the new features the invented retainer ring must, of course, provide all the advantages of the prior art rings, i.e. the new ring must provide secure support for the sprags in the ring, so that no sprag can get lost, even when the ring is not mounted between the clutch members.

SUMMARY OF THE INVENTION

The above stated objects are attained by a retainer ring having a Z-, H- or U-shaped cross section and having elongated holes in the central cylindrical ring portion, which holes are separated from one another by bridge portions. The holes are for mounting the sprags therein and extend with their long sides in axial direction of the clutch. From one of the short sides of each hole a lug projects to the inside and on this lug a helical spring is mounted which engages the tiltable sprag disposed in the hole and urges it into clamping position.

The retainer ring of Z-, H- or U-shaped cross section can be cut and pressed from sheet metal or it can be cast or die-cast in a mold or die. But regardless of the method of manufacture the ring is always one solid part, and for assembling a complete set of sprags all that is required is that the helical springs be mounted on the lugs and the sprags be placed in the elongated holes. Thereafter the whole set, comprising the ring, the sprags, and the springs, can be put in grease and stored.

Further, the wall of the retainer ring according to the invention can be made considerably thinner than the wall of the prior art rings. Less material and labor is, therefore, needed for manufacturing the ring so that it can be produced at lower costs. Moreover, it has been proven in practice that the ring, due to its one-piece design, is resistant to a very high thermal and mechanical load.

In the retainer ring according to the invention the weight of the springs rests against the ring itself so that the sprags do not have to carry this weight and thus are not affected thereby. Also, by the new retainer ring the axial dimension of the clutch is not extended compared with the prior art clutches.

In order to prevent the assembled set of sprags from falling apart when the retainer ring is not mounted between the clutch members it has proven advantageous to make the bridge portions the stop members for an axially extending edge provided on each sprag. The axially extending edge abuts against the bridge portion when the sprag is tilted to the extreme limit and thus limits the tilting movement of the sprag. In addition thereto the spring end which rests against the sprag is provided with a bent-over portion engaging an axially extending groove in the sprag. The sprags are thus individually secured in the holes of the ring against displacement in an outward radial direction by the bent-over spring portion and against displacement in an inward radial direction by the edge of the sprag abutting against the bridge portion.

Mounting the sprags in the described manner provides average safety. However, this amount of safety does not suffice if the retainer ring is inexpertly handled. The sprags are not secured against dropping out of the ring in a radial inward direction. If a sprag is tilted in the decoupling sense against the force exerted by the helical spring the axially extending edge of the sprag is moved away from the bridge portion so that it will not abut against this portion if the sprag is pressed in the inward direction. It is, therefore, suggested to provide a second axially extending edge on each sprag diametrically opposite to the first edge with regard to the tilting axis. Further, the bent-over end portion of the helical spring is designed to engage the groove in the sprag in such a manner that the sprag is secured against displacement in both radial directions.

In such a manner the sprags are indeed safely retained in the ring and protected against any possible loss, even when not mounted between the clutch members. Still the sprags are in a simple manner mountable in and removable from the ring.

BRIEF DESCRIPTION OF THE DRAWINGS

Further features and details of the invention will become apparent and will be more readily comprehended from the following description when taken in conjunction with the appending drawings, wherein:

FIG. 1 is a sectional view of a portion of a first embodiment of the retainer ring according to the invention wherein sprags are mounted, cut along line I–I in FIG. 2, FIG. 2 is a radial sectional view of the retainer ring of FIG. 1, cut along line II–II in FIG. 1, FIG. 3 is a view in radial direction from the outside of the retainer ring portion of the FIGS. 1 and 2, FIG. 4 shows an unmounted retainer ring portion according to the FIGS. 1 and 2, FIG. 5 is a sectional view of a portion of a second embodiment of the retainer ring according to the invention wherein sprags are mounted, cut along line V–V in FIG. 6, FIG. 6 is a sectional view of the retainer ring of FIG. 5, cut along line VI–VI in FIG. 5.

DESCRIPTION OF THE PREFERRED EMBODIMENTS

Figure 7:
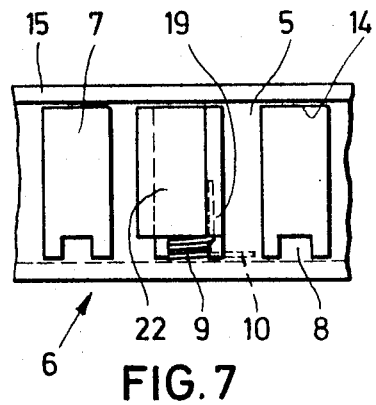
FIG. 7 is a view in radial direction from the outside of the retainer ring portion of FIGS. 5 and 6.

Referring now to the drawings wherein like elements are designated by like reference numerals throughout all Figures, the clutch in FIGS. 1 to 3 comprises an inner clutch member having a convex-cylindrical bearing surface 1 and an outer clutch member having a concave-cylindrical bearing surface 2. The inner and the outer clutch members may rotate with an equal angular velocity, however, they may also rotate with different velocity. Between the bearing surfaces 1 and 2 sprags 3 are arranged which are elongated in axial direction of the clutch but have partially cylindrical side surfaces 4. The sprags 3 are mounted in the holes 7 of a retainer ring 6 pressed from sheet metal and being of substantially Z-shaped cross section. The partially cylindrical side surfaces 4 of the sprags 3 are guided between bridge portions 5 which define between them the elongated holes 7 in the central ring portion. The sprags 3 are thus individually tiltable without interfering with one another.

Into the elongated holes 7 between the portions 5 project lugs 8 whereon helical springs 9 are disposed. The latter have two ends 10 and 11 each. The spring ends 10 rest against the bridge portions 5 while the spring ends 11 engage the sprags 3 in axially extending grooves 13 by means of bent-over end portions 12. The springs 9 urge the sprags 3 to tilt in the clamping sense, i.e. in a clockwise direction in FIGS. 1 to 3.

On the short side opposite from the lugs 8 each hole 7 is provided with a projection 14 which guides the sprag in axial direction and keeps it at a certain distance from the radial outwardly extending portion 15 of the retainer ring 6. The sprags 3 are thereby prevented from sliding on the ring portion 15 during the tilting movement.

In order to prevent the sprags 3 from dropping out of the retainer ring 6, when the ring is not mounted between the clutch members, the sprags are provided with an edge 16 which extends in axial direction of the clutch. The edge is disposed at the end of one of the partially cylindrical side surfaces 4 so that it is located on the inside of the cylindrical central portion of the retainer ring when the sprags are mounted in the ring holes 7. The edges 16 limit the tilting motion of the sprags 3 when the latter are pivoted in the clamping sense, i.e. in a clockwise direction in FIGS. 1 to 3. It will be apparent from FIG. 4 that under the force exerted by the spring 9 the sprags 3 occupy this end position when the retainer ring 6 is not mounted between the clutch members. In this position the edges 16 abut against the bridge portions, thus preventing the sprags 3 from dropping out of the retainer ring in a radially outward direction. Against dropping out in the opposite direction the sprags 3 are secured by the bent-over portions 12 of the spring ends 11 which engage the grooves 13.

In order to limit the tilting movement of the sprags in the decoupling direction to a preestablished angle, i.e. in the counterclockwise direction in FIGS. 1 to 3, the ends 11 of the springs 9 are so arranged that they abut against the bridge portions 5 if the sprags are pivoted in the counterclockwise direction through an angle which is great enough to remove the clamping surfaces of the sprags from the convex-cylindrical bearing surface 1 of the inner clutch member.

The manner in which the sprags 3 are mounted in the retainer ring 6 and secured against dropping out thereof—this manner being best illustrated in FIG. 4—is sufficient for most practical purposes. However, it has proven that losing sprags is not altogether prevented when the retainer ring is inexpertly handled. This will become readily apparent from FIG. 4 if it is assumed that a sprag is contacted on the inside of the retainer ring and pressed to the outside and is simultaneously tilted in the decoupling sense, i.e. in a counterclockwise direction. If handled in this way the sprag may drop out of the retainer ring to the outside when tilted through great enough an angle that the edge 16 cannot abut against the adjacent bridge portion 5.

This danger is overcome when sprags as shown in FIGS. 5 to 8 are mounted in the retainer ring. The sprags 17 illustrated in FIGS. 5 to 8 differ from the previously described sprags 3 in that they are provided with a second edge 18 in addition to the first-mentioned edge 16. The edge 18 is located diametrically opposite to the edge 16 with regard to the tilting axis which, at least substantially, coincides with the axis of symmetry of the helical springs 9. Edge 18 limits the tilting movement of the clamping element 17 in the coupling sense, i.e. in the clockwise direction as shown in FIG. 5 to the same angular position as edge 16.

Figure 8:
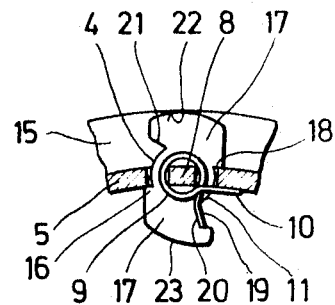
FIG. 8 shows an unmounted retainer ring portion according to FIGS. 5 and 6, and FIGS. 9 and 10 show two further embodiments of the retainer ring.

A further difference between the embodiments of the invention illustrated in FIGS. 1 to 4 and in FIGS. 5 to 8 is that in the latter embodiment the spring ends 11, which here point to the inside of the retainer ring 6, are provided with a U-shaped extension 19 each, engaging grooves 20 in the sprags 17 in such a manner that the sprags are secured against displacement in both radial directions, i.e. in the outward and inward direction. The sprags 17 are thus prevented from dropping out of the retainer ring, even if they are tilted from the extreme clamping position, as shown in FIG. 8, in a counterclockwise direction. If the sprag edge 16 can no longer abut against the bridge portion because the sprag has been tilted too far in the decoupling sense, the latter will still be retained in the ring by the spring extension 19 engaging the groove 20.

Moreover, the angle through which the sprags 17 of the embodiment shown in FIGS. 5 to 8 may be tilted in the counterclockwise direction is limited by the portions 21 which abut against the adjacent bridge portions 5. In most cases it will be desirable to design both the sprags 3 and 17 in a known manner so that the surface 22 of the sprags, which contacts the concave-cylindrical bearing surface 2 of the outer clutch member, represents the portion of a cylinder of which the axis coincides with the axis through the center of gravity of the cross section of the sprag. As a consequence thereof the sprags 3 and 17 are not tilted at all by centrifugal forces, neither in the coupling sense nor in the decoupling sense, if the retainer ring rotates together with the concave-cylindrical bearing surface 2. Tilting the sprags for contacting the convex-cylindrical bearing surface 1 is caused by the helical springs 9 only.

In case, however, the outer clutch member with its concave-cylindrical bearing surface 2 rotates during freewheeling at a very high speed relative to the inner clutch member it may be desirable to avoid altogether friction and wear between the sprags and the bearing surfaces. This can be accomplished in a simple and known manner by mounting the sprags in the retainer ring reversed by 180°. The sprags will then be urged to tilt in the decoupling sense by a torque resulting from the centrifugal forces, and during freewheeling the sprags will be lifted from the convex-cylindrical bearing surface 1 and together with the retainer ring they will gradually assume the angular velocity of the outer clutch member.

The rings and the sprags described in the present application can easily be assembled to form such a so-called "freewheeling clutch with automatic sprag lifting" simply by mounting the sprags 3, 17 together with the helical springs 9 in the ring reversed by 180°.

Figure 9:
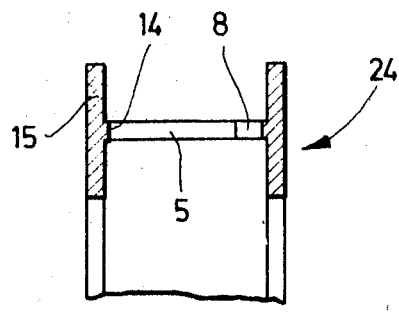
Figure 10:
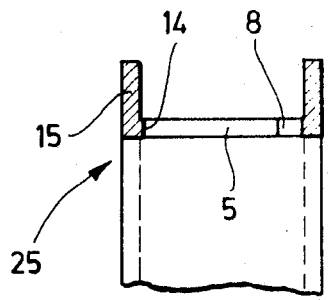

In FIGS. 9 and 10 are illustrated two more embodiments of the retainer ring according to the invention. FIG. 9 shows a ring 24 having a H-shaped cross section, while FIG. 10 shows a ring 25 having a U-shaped cross section. The description of the invention hereinbefore given in connection with the embodiments shown in FIGS. 1 to 8 also applies to the retainer rings 24 and 25 illustrated in FIGS. 9 and 10.

What I claim is:

1. A retainer ring for a freewheel clutch including an outer clutch member having a concave-cylindrical bearing surface and an inner clutch member having a convex-cylindrical bearing surface arranged in coaxial alignment with the outer clutch member, the retainer ring comprising: (a) a ring element comprising a cylindrical central portion of which the diameter is of about a mean value between the diameters of the convex and the concave cylindrical bearing surfaces and annular ring portions on both sides of the cylindrical central portion and extending in radial direction of the clutch for supporting the ring element between the inner and the outer clutch members, the cylindrical central portion having elongated holes extending with their long sides in axial direction of the clutch and bridge portions separating the elongated holes from one another, and at least one lug projecting from one of the short sides of each hole in axial direction of the clutch; (b) tiltable sprags in the elongated holes for clamping the inner and the outer clutch members; and (c) spring means mounted on the lugs operatively engaging the sprags for tiltably supporting the sprags in the holes and for urging the sprags in their clamping position between the bearing surfaces of the inner and the outer clutch members.

2. A retainer ring as claimed in claim 1, wherein the ring element with its cylindrical portion and its annular ring portions is of Z-shaped cross section.

3. A retainer ring as claimed in claim 1, wherein the ring element with its central portion and its annular ring portions is of H-shaped cross section.

4. A retainer ring as claimed in claim 1, wherein the ring element with its central portion and its annular ring portions is of U-shaped cross section.

5. A retainer ring as claimed in claim 1 wherein the tiltable sprags are each provided with a groove and an edge extending in axial direction of the clutch and abutting against the bridge portion of the cylindrical central portion when the sprags are tilted to the extreme clamping position, and the spring means comprise helical springs resting with one end against the ring element and having a bent-over portion of the other end engaging in the groove of the respective sprag, so that the sprags are secured against displacement in radial direction between the edges and the spring ends in the grooves.

6. A retainer ring as claimed in claim 5, wherein the tiltable sprags are provided with a second edge also extending in axial direction of the clutch, the second edge being disposed on the side surface of the sprag diametrically opposite from the first edge with regard to the tilting axis, and wherein the bent-over portions of the spring ends are U-shaped for securing the sprags against displacement in radial clutch direction.

7. A retainer ring as claimed in claim 1, wherein the short sides of the elongated holes opposite to the sides having the supporting lugs for the spring means are provided with projections operatively engageable with the sprags for keeping the sprags from contacting the radial ring portion.

8. A retainer ring as claimed in claim 1, wherein the spring ends resting against the sprags limit the tilting motion of the sprags in the declamping direction which ends abut against the adjacent bridge portion.